United States Patent [19]

Ito et al.

[11] Patent Number: 5,028,360
[45] Date of Patent: Jul. 2, 1991

[54] METHOD OF MANUFACTURING SPHERICAL SILICA PARTICLES

[75] Inventors: Yuziro Ito; Takashi Higashiogawa; Masahiro Matsuura; Koichi Orii; Yasumasa Yamaguchi, all of Yokohama, Japan

[73] Assignee: Nitto Chemical Industries Co., Ltd., Tokyo, Japan

[21] Appl. No.: 508,813

[22] Filed: Apr. 16, 1990

[30] Foreign Application Priority Data

Apr. 17, 1989 [JP] Japan .................. 01-095218

[51] Int. Cl.$^5$ .......... B29B 9/10; C01B 33/12; C01B 33/18
[52] U.S. Cl. ....................... 264/12; 264/13; 264/56; 423/335; 423/338; 423/339
[58] Field of Search ............. 264/12, 13, 56; 423/335, 339, 338

[56] References Cited

U.S. PATENT DOCUMENTS

| | | | |
|---|---|---|---|
| 4,678,652 | 7/1987 | Tamenori et al. | 423/339 |
| 4,683,128 | 7/1987 | Orii et al. | 423/338 |
| 4,767,433 | 8/1988 | Iura et al. | 65/21.1 |
| 4,853,198 | 8/1989 | Orii et al. | 423/335 |
| 4,857,289 | 8/1989 | Nauroth et al. | 423/339 |
| 4,857,290 | 8/1989 | Shimizu | 423/339 |
| 4,913,966 | 4/1990 | Garvey et al. | 428/402 |

FOREIGN PATENT DOCUMENTS

| | | |
|---|---|---|
| 50-67797 | 6/1975 | Japan ............. 423/335 |
| 58-2233 | 1/1983 | Japan . |
| 58-145613 | 8/1983 | Japan . |
| 60-131868 | 7/1985 | Japan . |
| 61-251509 | 11/1986 | Japan . |
| 62-3011 | 1/1987 | Japan . |
| 62-79841 | 4/1987 | Japan . |
| 62-96308 | 5/1987 | Japan . |
| 62-96309 | 5/1987 | Japan . |
| 62-96311 | 5/1987 | Japan . |
| 62-96312 | 5/1987 | Japan . |
| 62-96313 | 5/1987 | Japan . |
| 62-283809 | 12/1987 | Japan . |
| 63-225538 | 9/1988 | Japan . |

Primary Examiner—Mary Lynn Theisen
Attorney, Agent, or Firm—Cushman, Darby & Cushman

[57] ABSTRACT

A method of manufacturing spherical silica particles comprising the steps of processing in an acid-containing solution and then washing with water the coagulant derived from an aqueous alkali metal silicate solution extruded through pores in a water-miscible organic medium or acid solution, wet-grinding the amorphous silica thus obtained in a liquid dispersion medium to obtain a fine particle silica suspension with a weight average particle size of 10 μm or less, spray-drying this fine particle silica suspension with hot air and sintering the spherical granulated silica thus obtained. According to the present invention, the high-purity spherical silica particles can be obtained with high solidity and adjusted surface smoothness without any complicated operation or waste water treatment for use as a sealant filler for highly-integrated IC electronic parts.

37 Claims, 2 Drawing Sheets

METHOD OF MANUFACTURING SPHERICAL SILICA PARTICLES

BACKGROUND OF THE INVENTION

1. Field of the Invention

The present invention relates to a method of manufacturing spherical silica particles, and more particularly to a method of manufacturing spherical silica particles with high solidity and with adjusted surface smoothness, obtained through the sintering of spherical granulated silica obtained by spray-drying a fine particle silica suspension.

The spherical silica particles according to the present invention can be suitably used as a filler for resin composition (hereinafter referred to as sealant) for encapsulating IC electronic parts.

2. Prior Art

Recently, the chip area which contacts a sealant is increasing, and packages are becoming thinner as ICs are highly integrated. The demand in sealant quality is getting increasingly severe in order to protect chips with a thin sealant.

The first problem is heat stress resistance. Because heat stress is caused by the difference in the thermal expansion coefficient of both a silicon chip and sealant, adhesiveness of the sealant to the chip deteriorates. So, to bring thermal expansion coefficient of the sealant close to that of the silicon chip, a method is used where as large an amount of silica as possible, which has a low thermal expansion coefficient, is added to a resin as a filler.

Conventionally, crushed silica has been used for filler silica which is manufactured through crushing and has irregular shapes and sharp angles. Sealants with a high filling ratio of this crushed silica, however, had poor fluidity because of their high viscosity during molding. It thus has been become impossible to achieve homogeneous packages with the prescribed characteristics. Moreover, sharp-angled, crushed silica would wear down a mold and potentially lead to damage of the aluminum wiring on chips by piercing the protective sealant on the chip surface. Spherical silica with good fluidity and no sharp angles has therefore been ardently sought.

Among the conventional methods of manufacturing spherical silica particles which have been proposed are the following:

1) A flame-fusing method for crushed silica (for example, Japanese Patent Application Kokai No. 58-145613);
2) A method for a sol solution obtained from a hydrolysis of an alkyl silicate, wherein the sol solution is sprayed into a heated medium, dryed, granulated and flame-fused (for example, Japanese Patent Application Kokai No. 58-2233);
3) A method for partially condensed sol obtained from a hydrolysis of a silicon alkoxide, wherein the alcohol is removed from the sol, which is subsequently dispersed in water and the precipitated silica gel is baked (for example, Japanese Patent Application Kokai No. 63-225538).

The following problems arise in the conventional methods of manufacturing spherical silica particles described above.

The particles obtained from the Methods 1) and 2) have a small adhesiveness toward a resin because their surfaces are too smooth, making them inappropriate as a filler for sealants. The flame-fusing method, furthermore, imposes economic restrictions because of the quantities of expensive hydrogen and oxygen consumed. The high cost of the raw material in the Method 2) is further compounded by the need to treat the effluent which contains organic substances derived from the raw material.

The particles obtained from Method 3) are ideally shaped for a sealant filler, but the complexity of processes and operations involved, the expense of the raw materials, and the need for waste water treatment remain incumbent problems.

In order to prevent the emergence of soft errors attendant upon an enhancement of the degree of integration of IC electronic parts, highly pure filler has been sought for the employed sealant.

Replying to this demand are high-purity spherical silica particles with low content in such impurities as alkali metals, alkaline earth metals, halogens or radioactive substances.

SUMMARY OF THE INVENTION

The present inventors have eagerly conducted their research to solve the problems in the prior art. Consequently, the present inventors have found that spherical silica particles with surface smoothness adjustable between a smooth surface to one with minute projections and depressions can be obtained by wet-grinding of amorphous silica manufactured from an aqueous alkali metal silicate solution as a raw material, followed by spray-drying the fine silica particle suspension obtained and sintering the resulting spherical granulated silica. Thus, the present invention has been completed.

The gist of the present invention is a method of manufacturing spherical silica particles comprising the steps of processing in an acid-containing solution and then washing with water the coagulant derived from an aqueous alkali metal silicate solution extruded through pores into a water-miscible organic medium or acid solution, wet-grinding the amorphous silica thus obtained in a liquid dispersion medium to obtain a fine particle silica suspension with a weight average particle size of 10 $\mu$m or less, spray-drying this fine particle silica suspension with hot air and sintering the spherical granulated silica thus obtained.

An object of the present invention is to obtain highly pure spherical silica particles with high solidity, low amounts of impurities contained as such alkali metals, alkaline earth metals, halogens or radioactive substances, no sharp angles, good fluidity, and with adjusted surface smoothness, without complicated handling or effluent treatment, using an aqueous alkali metal silicate solution as a raw material.

Other objects and advantages of the invention will become apparent from the following description.

PREFERRED EMBODIMENT OF THE INVENTION

Figure 1:
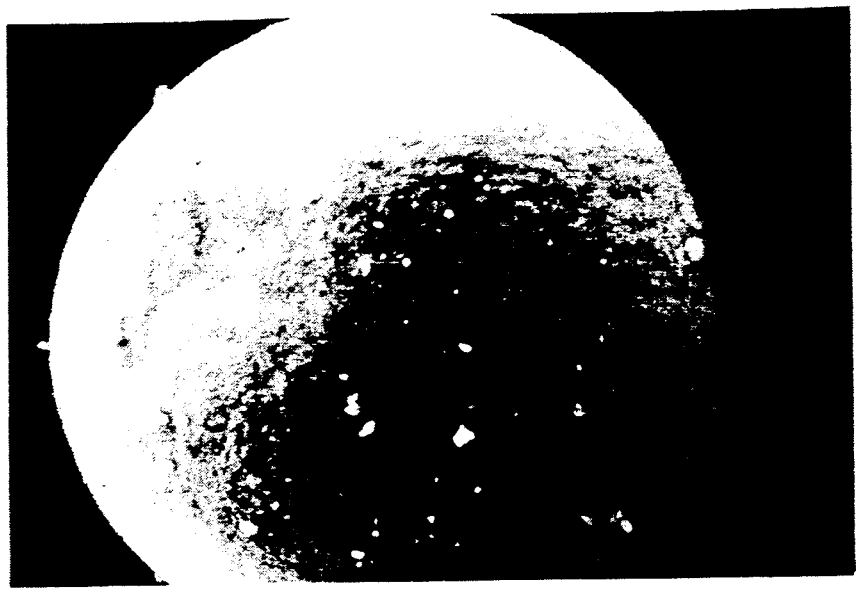
FIG. 1 through FIG. 5 are electron micrographs of the spherical silica particles obtained according to the present invention, and correspond to the respective experiment Nos. in Example 2 shown in Table 3.

In the present invention, spherical silica particles refer to the silica particles whose ratio of long diameter to short diameter is in a range of 1 to 0.6.

The present invention shall be described below in sequence. A method of manufacturing spherical silica particles of the present invention consists of the following four steps.

Step 1: Amorphous silica manufacture process

The process in which the coagulant obtained from coagulating an aqueous alkali metal silicate solution in a water-miscible organic medium or acid solution is treated with an acid-containing solution and washed with water to manufacture amorphous silica.

Step 2: Fine particle silica suspension preparation process

The process of wet-grinding the amorphous silica obtained Step 1 in a liquid dispersion medium to prepare a suspension containing fine particle silica of which the weight average particle size is 10 μm or less.

Step 3: Spherical granulated silica manufacture process

The process in which the fine particle silica suspension obtained in Step 2 is granulated by spray-drying with hot air to obtain spherical granulated silica.

Step 4: Spherical granulated silica sintering process

The process in which the spherical granulated silica obtained in Step 3 is sintered for conversion into dense spherical silica particles.

A sequential explanation of each process described above is provided below.

1) Amorphous silica manufacture process (Step 1)

Impurity content of the amorphous silica manufactured through this process does not restrict the present invention at all. However, it is preferable to use a high-purity amorphous silica with low impurity content correspondent to the targeted application of spherical silica particles.

Particularly in the case of manufacturing spherical silica particles used as a sealant filler for highly integrated IC electronic parts, the amorphous silica or spherical silica particles in the present invention should have:

(1) content of 1 ppm or less each of alkali metals such as Na, K, etc., alkaline earth metals such as Mg, Ca, etc., and halogens, and (2) content of 1 ppb or less each of radioactive elements such as U, Th, etc.

This kind of high-purity amorphous silica with low impurity content can be obtained using the method described in Japanese Patent Application Kokai Nos. 62-3011 or 62-283809, for example, which were previously proposed by the present inventors, by treating with an acid-containing solution, the finely fibrous coagulant obtained by extruding an aqueous alkali metal silicate solution through pores into a water-miscible organic medium or acid solution, and washing it with water to extract and remove impurities.

Hence, the aqueous alkali metal silicate solution with a viscosity in a range of 2 to 500 poise is extruded into a coagulant bath consisting of a water-miscible organic medium or acid solution through a nozzle with a hole size in a range of 0.02 to 1 mm to form a fibrous, prismatic or granular coagulant. The gel thus obtained is treated with an acid-containing solution and then washed with water to extract and remove impurities.

The aforesaid method yields high-purity amorphous silica having a hollow structure enclosed by walls with countless cracks on both the inside and outside. Moreover, the amount each of the aforesaid impurities as well as Al, Fe, Ti, etc. contained, is 1 ppm or less.

A preferred nozzle for use precludes the problem of the gelled alkali metal silicate in the coagulant bath sticking to the nozzle surface by being made of a precious metal alloy such as gold-platinum or a tetrafluoroethylene resin, or being covered with a precious metal alloy or tetrafluoroethylene resin.

The water-miscible organic medium used for the coagulant bath includes alcohols such as methanol, ethanol, n-propanol etc.; esters such as methyl acetate, ethyl acetate etc.; ketones such as acetone, methyl ethyl ketone etc.; amides such as dimethyl acetamide, dimethyl formamide etc.; and dimethyl sulfoxide, etc. These may be used alone or in combination.

The acid in the acid solution used as the coagulant bath is an inorganic acid such as sulfuric acid, nitric acid, hydrochloric acid, etc. preferably sulfuric acid or nitric acid. These acids may be used alone or in combination. In practice, a solution of these acids is preferably an aqueous solution. An acid concentration is in a range of 0.1 to 4 N, preferably 0.5 to 3 N, and most preferably 1 to 2 N.

The coagulant bath should be kept at 25° C. or more, preferably in a temperature range of 40° to 80° C.

It is possible to use known methods of washing, etc., with an aqueous solution containing substances selected from a mineral acid such as sulfuric acid, nitric acid, hydrochloric acid, etc., a peroxide such as hydrogen peroxide, etc., and a chelating agent, etc. in purification of the silica obtained through the reaction between the aqueous alkali metal silicate solution and the acid.

2) Fine particle silica suspension preparation process (Step 2)

In this process the amorphous silica obtained in Step 1 is wet-ground and a fine particle silica suspension is prepared.

It is possible to use ordinary grinding equipment for the wet-grinding in this process; for example, a rolling ball mill such as a pot mill, tube mill, conical ball mill, compartment mill, etc.; a vibrating ball mill; or a medium stirring mill such as a tower grinder or a tank-type agitation mill, etc. Preferably, a rolling ball mill or vibrating ball mill is used.

The material for the part of the grinding equipment which comes into contact with the silica and the grinding medium such as balls, rods, etc., which is used if necessary, may generally be selected from alumina, zirconia, plastic-clad steel, silicon carbide, silicon nitride, etc. If aluminum or zirconium contamination is undesirable, the choice may be any silicic material such as quartz glass, fused quartz, quartz crystal, agate, quartzite, etc.

A size of a grinding medium consisting of a rigid body such as the ball, etc., which is used if necessary, is in a range of 0.1 to 25 mm, preferably 0.5 to 25 mm, more preferably 1 to 10 mm, in diameter. Particularly, when seeking ultra fine particle silica with an average particle size of 1 μm or less, the diameter of the grinding medium is in a range of 0.1 to 5 mm, preferably 1 to 5 mm.

Water is preferably used as a liquid dispersion medium for wet-grinding. Colloidal silica, carboxymethyl cellulose, etc., may be added as a binding agent.

Liquid organic compounds may also be used as the liquid dispersion medium for wet-grinding, with specific examples of water-soluble liquid organic compounds being alcohols such as methanol, ethanol, etc.; amides such as formamide, dimethyl formamide, dimethyl acetamide, etc.; and ketones such as acetone, methyl ethyl ketone, etc. These may be used alone or in combination.

It is also possible to use a liquid dispersion medium which combines water and a water-soluble organic compound. Water-soluble organic compounds used in combination with water include the water-soluble liquid organic compounds mentioned above and water-soluble solid organic compounds such as surface-active agents, binding agents, etc.

The pH of the grinding system when an aqueous medium is used as the liquid dispersion medium is in a range of 2 to 11, preferably 2 to 5 or 7 to 11. If the pH of the system is below 2 in the grinding, the acid content rises; if the pH exceeds 11, the solubility of the silica in the medium undesirably rises. Finally, the fluidity of the silica suspension obtained tends to decline in a range of more than 5 but less than 7.

When adjusting the pH, mineral acids such as sulfuric acid, hydrochloric acid, etc., can be used for an acid, and amines such as methylamine, ammonia, etc. for an alkali.

As the amorphous silica that is wet-ground in this process, the slurry one obtained after washing with water but before separating the water in Process 1, wet one after washing with water and separating the water in Process 1, dry one obtained by drying the above wet material by a suitable method, or baked one obtained by heating and baking the above dry one by a suitable method may be used. These may be selected freely in relation to the prescribed surface smoothness of the spherical silica particles. They may be used alone or mixed in a desired proportion for the wet-grinding.

Conditions for the grinding, such as quantities of amorphous silica and grinding medium to go into the grinding equipment, the selection and combination of the grinding medium size, etc., are chosen according to the thermal history of the amorphous silica, average particle size of the fine particle silica targeted in this process, concentration of silica in the suspension, etc.

When the amorphous silica is baked after washing with water under suitable conditions, it is possible to lower the pore volume of the silica particles as well as the concentration of silanol group. A baking temperature for the amorphous silica in this process is in a range of 500° to 1300° C., preferably in a range of 800° to 1290° C.

If silica with a small pore volume and low concentration of silanol group is used as the amorphous silica for the wet-grinding, the viscosity of the fine particle silica suspension obtained is not high. Consequently, it is possible to raise the concentration of silica in the fine particle silica suspension that is able to be handled after the wet-grinding.

The concentration of silica in the fine particle silica suspension obtained in this process is set preferably in a range of 5 to 45 wt. % when unbaked amorphous silica is used. When the amorphous silica used is baked, the concentration depends upon the baking conditions and is in a range of 30 to 80 wt. %.

The fine particle silica obtained in this process is granulated into spherical shapes in the forthcoming Step 3. This spherical granulated silica is sintered to spherical silica particles in the forthcoming Step 4. Hence, the average particle size of the fine particle silica is an important factor which have a effect upon the denseness and strength of the spherical silica particle. The smaller the average particle size of the fine particle silica becomes, the more dense the spherical silica particles obtained in Step 4 become.

In the present invention, it is important for the average particle size of the fine particle silica to be 10 μm or less, preferably 5 μm or less, and most preferably in a range of 0.3 to 1 μm. If the average particle size exceeds 10 μm, the temperature needed for sintering rises excessively. As a result, sintering occurs not only inside the particles, but also between them, so that the proposed spherical silica particles cannot be obtained.

3) Spherical granulated silica manufacture process (Step 3)

The fine particle silica suspension prepared in Step 2 is sprayed in a stream of hot air, granulated into spherical shapes and dried via a spray-drying method to manufacture spherical granulated silica.

A parallel flow, counterflow or combination flow may be selected as the relationship between the direction of the hot air flow and the direction of the fine particle silica suspension sprayed. Hot air may be supplied to the area to be dried in a number of stages.

There are a variety of mechanisms which may be employed as the spray method for the fine particle silica suspension, including a centrifugal type, pressure nozzle type, and binary fluid nozzle type, etc.

Particle sizes of the spherical granulated silica are set so as to be 0.2 mm or less, preferably 0.15 mm or less, and more preferably 0.1 mm or less. If spherical granulated silica with particle sizes in this range is used in Step 4, the particle size of the spherical silica particles obtained after sintering is 0.1 mm or less.

A concentration of silica in the fine particle silica suspension that is spray-dried in this process is in a range of 5 to 80 wt. %, and preferably 10 to 60 wt. %.

A temperature of the hot air is in a range of 10° to 450° C., preferably 30° to 250° C.

If the concentration of silica in the fine particle silica suspension is low and the temperature of the hot air is high during spray-drying, a spherical shape of the dried silica cannot be achieved; instead, they will be hollow and there will be large depressions on the particle surface. To prevent this, it is preferable to raise the concentration of silica in the fine particle silica suspension and lower the temperature of the hot air.

A pH of the fine particle silica suspension to be spray-dried is in a range of 2 to 11.

Amorphous silicas with different thermal histories are wet-ground separately in the aforesaid Step 2. The various fine particle silica suspensions obtained can be mixed in suitable proportions and used in this process for manufacturing spherical granulated silica.

By mixing amorphous silicas with different thermal histories depending upon the differences in baking conditions or the presence of the baking treatment, the following effects can be achieved.

First of all, the range of the concentrations of silica in the fine particle silica suspensions obtained in Step 2 can be expanded.

Use of baked amorphous silica in the wet-grinding in Step 2 allows the concentration of silica in the fine particle silica suspension to be raised as previously stated.

By changing the composition ratio of the mixture of amorphous silicas with different thermal histories, a fine particle silica suspension of a suitable concentration of silica can be obtained. The upper limit of concentration of silica is the concentration of silica in the fine particle silica suspension obtained by grinding baked amorphous silica alone.

Secondly, the surface condition of the spherical silica particles sought by the present invention can be controlled.

The mixture of amorphous silicas with different thermal histories is comprised of silica particles with different shrinkage ratio. By sintering the spherical granulated silica obtained from this type of mixture, it is possible to obtain spherical silica particles with a number of fine surface projections and depressions. By selecting heat processing conditions for the amorphous silica components with different thermal histories that comprise the spherical granulated silica and by selecting the mix ratio of each component, it is possible to control the extent of spherical silica particle surface roughness.

For example, the mix ratio of unbaked amorphous silica to baked amorphous silica may be in a range of 99:1 to 20:80, preferably 95:5 to 40:60, by weight.

The control of mix ratios for amorphous silicas with different thermal histories can take place at the raw material preparation stage for the wet-grinding in Step 2 and/or at the raw material preparation stage for the spray-drying in Step 3.

4) Spherical granulated silica sintering process (Step 4)

In this process, the spherical granulated silica in Step 3 is sintered and spherical silica particles endowed with the final functionality are obtained.

Because the spherical granulated silica obtained in Step 3 has many pores along with a high water content, and the fine particle silica obtained in Step 2 mutually coagulates only slightly therein, it is not suitable for a sealant filler.

The objects of the sintering treatment in this process are:

(1) Primarily, to make use of the differences in shrinkage ratio in the sintering depending upon the thermal histories and the particle sizes of fine particle silica that comprises the spherical granulated silica, thereby forming many fine depressions and projections on the surface of the spherical silica particles;

(2) To remove the residual water in the spherical granulated silica and to decrease the existing silanol group in an amount of 0.1 wt. % or less, thereby making the silica particles hydrophobic;

(3) To close the pores which the spherical granulated silica has to lower a specific surface area to 50 $m^2/g$ or less, thereby forming spherical silica particles with a dense structure that is difficult for water to penetrate.

When spherical silica particles according to the present invention are used as a sealant filler for electronic part, these "numerous, fine projections and depressions" increase the area of adhesion with the resin and improve the adhesion thereby raising the sealing strength.

The coefficient of linear contraction of the spherical granulated silica in the sintering treatment is in a range of 10% to 50%.

Sintering is conducted through heat treatment. The sintering temperature that can achieve the objectives stated above in (1), (2) and (3) is 1000° C. or more, preferably in a range of 1100° to 1300° C. When the sintering temperature is less than 1000° C., the objectives stated above in (1), (2) and (3) are not fully achieved.

For example, in silica obtained by baking at 800° C. the amorphous silica obtained by the Step 1 described above, 2 wt. % of the silanol group remains. The amount of the remaining silanol group is measured as decrease in weight when further baking at 1250° C. the silica obtained by the baking at 800° C. It is also shown that pores remain with a specific surface area of 500 $m^2/g$. After exposing these silica particles to an atmosphere with 70% relative humidity and a temperature of 20° C. for 3 days, the absorption of water was 3 wt. %.

Although a sintering time depends on the sintering temperature, it is set within a range of, for example, 0.01 to 100 hours, preferably 0.1 to 50 hours in order to achieve the objectives stated above in (1), (2) and (3).

The atmosphere in which the sintering is performed is not critical as long as the objectives of the present invention are not lost. Inert gases such as Ar, He and the like; oxidative atmospheres such as air and the like; reductive atmospheres such as hydrogen and the like; steam atmospheres; and chlorine-containing atmospheres that can effectively remove impurities from silica can be used.

A heat source is arbitrary, where electrical heating or combustion gas heating is economical. In addition, plasma heating or image oven heating can be used.

According to the present invention, spherical silica particles with an adjusted surface smoothness can be obtained in a range of 0.1 mm or less for the particle size, and 5 to 40 $\mu$m, preferably 10 to 40 $\mu$m, for the average particle size, such that the surface condition can be nearly smooth or up to having many fine depressions and projections.

The surface conditions of the spherical silica particles can be adjusted by selecting the mix ratio of fine particle silicas with different thermal histories and the particle sizes of the fine particle silica constituting the spherical granulated silica.

The spherical silica particles according to the present invention particularly have many fine depressions and projections on the particle surfaces which increase the adhesive area with the resin, and consequently are used preferably as a sealant filler for highly-integrated IC electronic parts.

The present invention is explained in more detail below referring Examples. However, the present invention should not be construed to be restricted by the Examples.

EXAMPLE 1

1-1) Amorphous Silica Manufacture 1-1-1) Wet Silica

JIS No. 3 water glass was heated and concentrated to attain a viscosity of 300 cps at 20° C. About 8 liters of this water glass was pressurized by a pump; made go through a filter (mesh 7 $\mu$m) and extruded at a velocity of 1 m/sec through a nozzle (pore size 0.2 mm, 50 pores) into a coagulation bath containing 300 liters of 8 wt. % aqueous sulfuric acid solution maintained at 50° C. The fibrous silica obtained was immersed in a freshly prepared 8 wt. % aqueous sulfuric acid solution of 10 times the amount of the silica. By stirring for about 1 hour at about 95° C., the impurities were extracted and removed.

The short fibrous silica obtained was washed with pure water until the washings reached pH 4. After removing the water with a centrifuge, 7.1 kg of wet silica was obtained. The water content of the wet silica obtained was 100 wt. % compared to a silica dry-weight.

1-1-2) Dry Silica

The 7.1 kg of wet silica obtained according to 1-1-1) above was dried for 8 hours at 150° C. using a hot air drier to obtain 3.7 kg of dry silica.

1-1-3) Baked Silica

The 3.7 kg of dry silica obtained according to 1-1-2) above was placed in a quartz crucible and heated for 2 hours at 1,200° C. in an electric oven to obtain 3.4 kg of baked silica.

1-2) Fine Particle Silica Suspension Preparation

Various amorphous silicas obtained according to 1-1) above were wet-ground using the equipment specified in Table 1, to obtain various fine particle silica suspensions.

TABLE 1

|  | Ball Mill A | Ball Mill B |
|---|---|---|
| Pot material and volume | Quartz glass 9 liters | Alumina 200 liters |
| Ball specification | Quartz glass 5 mm dia. | Alumina 5 mm dia. |

1-2-1) With 0.8 liters of pure water, 1.3 kg of the wet silica obtained according to 1-1-1) above was ground for 24 hours at 60 rpm with the above Ball Mill A filled with 4 liters of balls. A fine particle silica suspension (solid content 30 wt. %) was obtained with an average particle size of 0.5 μm. 1-2-2) The wet silica and baked silica obtained according to 1-1) were used alone or in admixture as grinding materials and wet-ground according to the method described in 1-2-1) above. Various fine particle silica suspensions shown in Table 2 were obtained.

The solid contents in the fine particle silica suspensions obtained were each 30 wt. %.

The average particle sizes of the silica particles in the fine particle silica suspensions obtained by wet grinding were measured by a centrifuge-precipitation light-transmission method.

TABLE 2

| No. | Device | Grinding Conditions | | | | | Fine particle silica average particle size (μm) |
|---|---|---|---|---|---|---|---|
| | | Amount charged | | | The number of rotations (rpm) | Time (hr) | |
| | | Ground material (kg) | Pure water (l) | Balls (l) | | | |
| 1 | Ball mill A | Wet silica 1.3 | 0.8 | 4 | 60 | 24 | 0.5 |
| 2 | Ball mill A | Baked silica 0.63 | 1.5 | 4 | 60 | 24 | 0.5 |
| 3 | Ball mill A | Wet silica 1.0 Baked silica 0.13 | 1.0 | 4 | 60 | 24 | 0.5 |
| 4 | Ball mill B | Wet silica 36 | 24 | 100 | 30 | 24 | 0.6 |
| 5 | Ball mill B | Baked silica 18 | 42 | 100 | 30 | 24 | 0.6 |

1-3) Manufacturing and Sintering of Spherical Granulated Silica

The various fine particle silica suspensions obtained according to 1-2) above were granulated and dried using a spray-drying device. The obtained spherical granulated silicas were sintered to yield dense spherical silica particles.

The average particle size of the sintered silica particles were measured by a laser light scattering method.

1-3-1) As shown in No. 3 of Table 2, the fine particle silica suspension obtained from a mixture of the wet silica and baked silica was spray-dried using the spray-drying device A equipped with the following specifications. After about 1 hour, about 115 g of spherical granulated silica was obtained.

| Specifications of Spray-Drying Device A | |
|---|---|
| Cylinder diameter: | 13 cm (main part material: glass) |
| Height: | 50 cm |
| Spray system of silica suspension: | binary fluid nozzle |
| Conditions: | Hot air: 300 l/min |
| | Hot air temperature (at the entrance): 70° C. |
| | Supply rate of suspension: 5 ml/min |

The obtained spherical granulated silica was placed in a quartz crucible and heated in an electric oven for 2 hours at 1,200° C. to sinter. 82 grams of spherical silica particles were obtained.

Spherical silica particles without imperfections and with many fine depressions and projections on the surface were obtained with an average particle size of 12 μm and a density of 2.2 g/cm$^3$.

The spherical silica particles had impurity contents of 0.3 ppm for Na, 0.4 ppm for Al, 0.1 ppm for Zr, and 0.05 ppb or less for U. 1-3-2) A mixture of the fine particle silica suspension obtained from the wet silica (Table 2, No. 1) and the fine particle silica suspension obtained from the baked silica (Table 2, No. 2) (mix ratio 8:2) was processed in the same manner as in 1-3-1) above. Spherical silica particles without imperfections and with many fine depressions and projections on the surface were obtained with an average particle size of 12 μm and a density of 2.2 g/cm$^3$.

The spherical silica particles had impurity contents of 0.3 ppm for Na, 0.4 ppm for Al, 0.1 ppm for Zr, and 0.05 ppb or less for U. 1-3-3) Dry silica obtained according to 1-1-2) above was heated for a further 2 hours at 600° C. and wet-ground according to the method described in 1-2-1) above to yield a fine particle silica suspension (solid content 30 wt. %) with an average particle size of 0.5 μm.

A mixture of this fine particle silica suspension and the fine particle silica suspension obtained from the wet silica according to 1-2-1) above (mixture ratio 2:8) was processed in the same manner as in 1-3-1) above except that hot air was supplied at 100 l/min and the entrance hot-air temperature was 180° C. Spherical silica particles without imperfections and with many fine depressions and projections on the surface were obtained with an average particle size of 12 μm and a density of 2.2 g/cm$^3$.

1-3-4) With a rotary evaporator (volume: 10 liters), 8 kg of the fine particle silica suspension (Table 2, No. 2; solid content 30 wt. %) obtained from the baked silica was concentrated under reduced pressure to yield a fine particle silica suspension with a solid content of 60 wt. %.

Spherical silica particles were obtained from this fine particle silica suspension in the same manner as in 1-3-1) above.

Spherical silica particles without imperfections and with many fine depressions but few projections on the surface were obtained with an average particle size of 14 μm and a density of 2.2 g/cm$^3$. 1-3-5) A mixture of a fine particle silica suspension (solid content 60 wt. %) obtained from the baked silica according to 1-3-4) above and a fine particle silica suspension (solid content 30 wt. %) obtained from the wet silica according to 1-2-1) above (mix ratio 1:1) was processed in the same manner as in 1-3-3) above. Spherical silica particles without imperfections and with many fine depressions and projections on the surface were obtained with an average particle size of 13 μm and a density of 2.2 g/cm$^3$.

EXAMPLE 2

In accordance with No. 4 or No. 5 shown in Table 2 above, the fine particle silica suspension from the wet silica and the fine particle silica suspension from the baked silica were prepared respectively. The obtained fine particle silica suspensions were alone or as a mixture spray-dried with the spray-drying device B having the following specifications.

| Specifications of Spray-Drying Device B | |
|---|---|
| Cylinder diameter: | 3.2 m |
| Height: | 7 m |
| Spray system of silica suspension: | Centrifugal |
| Conditions: | Hot air: 30 m$^3$/min |
| | Hot air temperature (at the entrance): 125° C. |
| | Supply rate of suspension: 70 l/hr |

The spherical granulated silicas obtained by spray-drying fine particle silica suspensions with consistencies shown in Table 3 was placed in quartz crucibles, respectively, and heated in an electric oven at 1,250° C. for 2 hours to sinter. Thus, spherical silica particles were obtained.

TABLE 3

| Experiment No. | Fine particle silica suspension mix ratio (weight ratio) | | Spherical silica particles | |
|---|---|---|---|---|
| | No. 4 (wet silica) | No. 5 (Baked silica) | Average particle size (μm) | Drawing Photo. No. |
| 2-1 | 100 | 0 | 17 | FIG. 1 |
| 2-2 | 90 | 10 | 18 | FIG. 2 |
| 2-3 | 80 | 20 | 18 | FIG. 3 |
| 2-4 | 40 | 60 | 18 | FIG. 4 |
| 2-5 | 0 | 100 | 20 | FIG. 5 |

The spherical silica particles obtained had specific surface areas a range of 1-10 m$^2$/g with a density of 2.2 g/cm$^3$ and without imperfections. The surface conditions, however, differed according to the constitution of the fine particle silica suspension used. Some were close to smooth, some chiefly had many fine depressions with few projections, and some had many fine depressions and projections.

Electron micrographs showing the structures of spherical silica particles are attached as FIG. 1–FIG. 5.

FIG. 1 shows well-sintered silica particles obtained solely from wet silica with relatively smooth surfaces.

Figure 2:
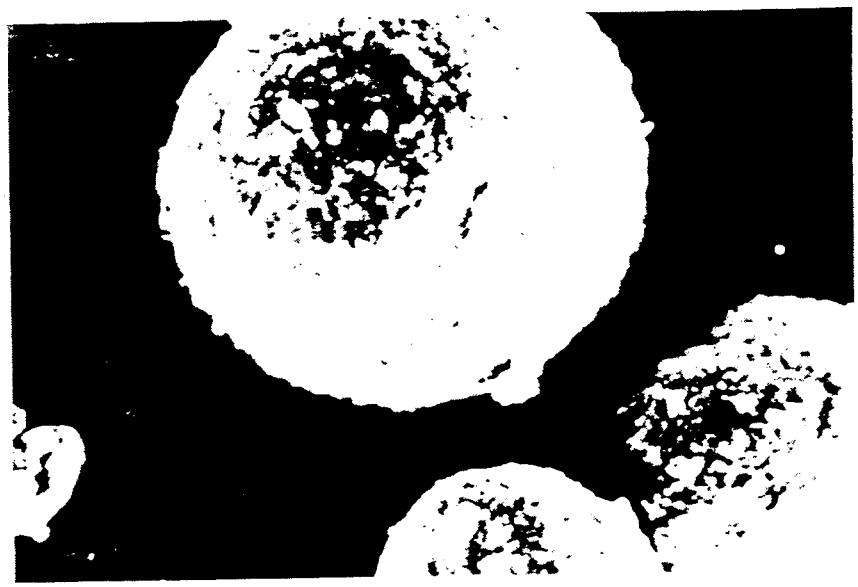
Figure 3:
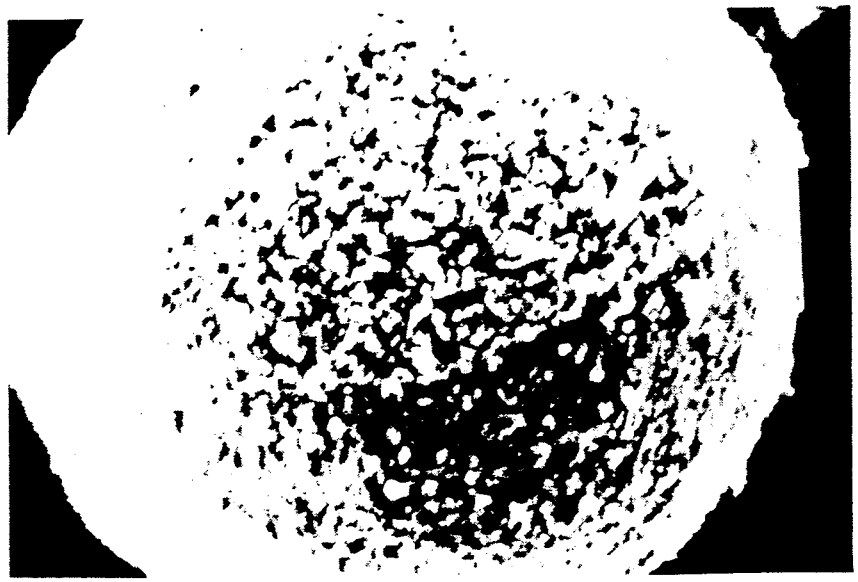
Figure 4:
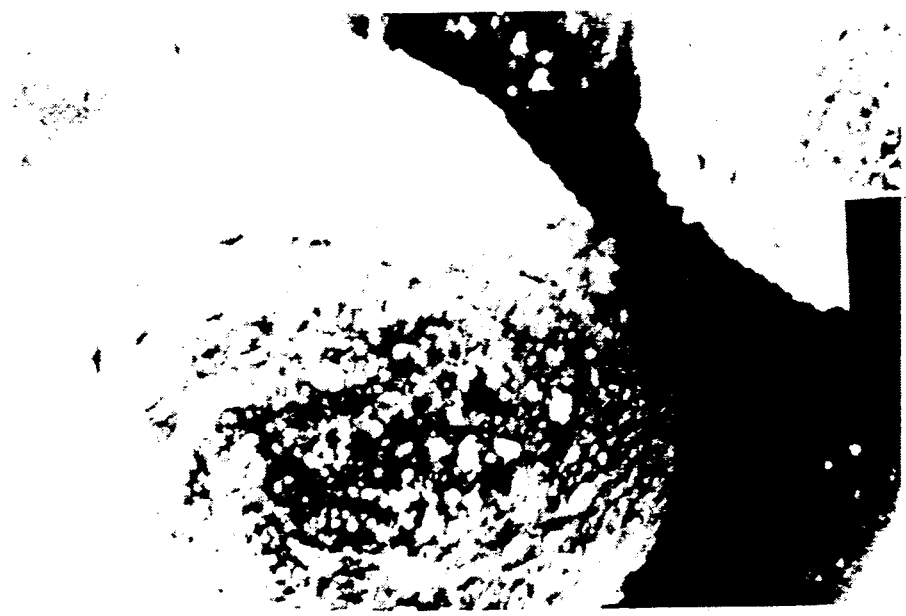

FIG. 2 through FIG. 4 show sintered silica particles obtained from a mixture of wet silica and baked silica, where many fine depressions and projections exist on the surface.

Figure 5:
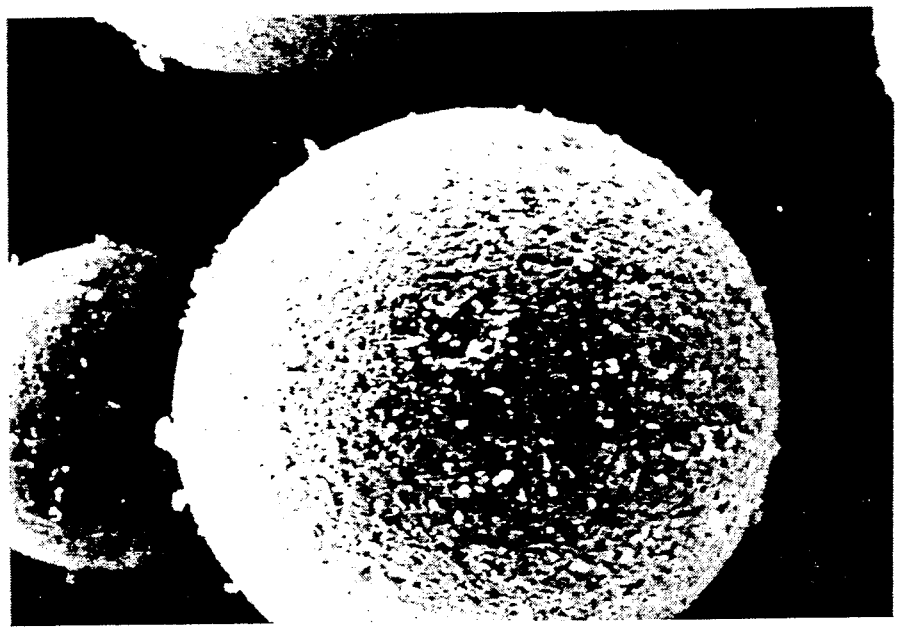

FIG. 5 shows sintered silica particles obtained solely from baked silica, of which the surfaces have many fine depressions but few projections.

The spherical silica particles obtained were exposed in an environment of a temperature 20° C. and 70% relative humidity. Neither increase in quantity nor hydroscopicity was observed.

What is claimed is:

1. A method of manufacturing spherical silica particles comprising the steps of processing in an acid-containing solution and then washing with water the coagulant derived from an aqueous alkali metal silicate solution extruded through pores into a water-miscible organic medium or acid solution, wet-grinding amorphous silica thus obtained in a liquid dispersion medium to obtain a fine particle silica suspension with a weight average particle size of 10 μm or less, spray-drying this fine particle silica suspension with hot air and sintering spherical granulated silica thus obtained.

2. A method of manufacturing spherical silica particles according to claim 1, wherein the amorphous silica is obtained by extruding an aqueous alkali metal silicate solution with a viscosity in a range of 2–500 poises through a nozzle having a pore size in a range of 0.02–1 mm into a coagulation bath consisting of a water-miscible organic medium or acid solution to form a fibrous, prismatic or granular coagulant, treating the obtained gel with an acid-containing solution, and extracting and removing impurities with water.

3. A method of manufacturing spherical silica particles according to claim 2, wherein the water-miscible organic medium is at least one selected from the group consisting of alcohols, esters, ketones, amides and dimethylsulfoxide.

4. A method of manufacturing spherical silica particles according to claim 2, wherein the acid of the acid solution is at least one selected from the group consisting of sulfuric acid, nitric acid and hydrochloric acid.

5. A method of manufacturing spherical silica particles according to claim 4, wherein the concentration of the acid solution is a range of 0.1–4 N.

6. A method of manufacturing spherical silica particles according to claim 4, wherein the concentration of the acid solution is in a range of 0.5–3 N.

7. A method of manufacturing spherical silica particles according to claim 4, wherein the concentration of the acid solution is in a range of 1–2 N.

8. A method of manufacturing spherical silica particles according to claim 1, wherein the contents of alkali metals, alkaline earth metals and halogens as impurities in the amorphous silica are respectively 1 ppm or less.

9. A method of manufacturing spherical silica particles according to claim 1, wherein the content of radioactive element as an impurity in the amorphous silica is 1 ppb or less.

10. A method of manufacturing spherical silica particles according to claim 1, wherein the liquid dispersion medium is water.

11. A method of manufacturing spherical silica particles according to claim 10, wherein the pH of the grinding system is in a range of 2–11.

12. A method of manufacturing spherical silica particles according to claim 10, wherein the pH of grinding system is in a range of 2–5 or 7–11.

13. A method of manufacturing spherical silica particles according to claim 1, wherein the liquid dispersion medium is a liquid organic compound.

14. A method of manufacturing spherical silica particles according to claim 13, wherein the liquid organic compound is at least one selected from the group consisting of alcohols, amides and ketones.

15. A method of manufacturing spherical silica particles according to claim 1, wherein the liquid dispersion medium is a mixture of water and a water-soluble organic compound.

16. A method of manufacturing spherical silica particles according to claim 1, wherein the amorphous silica is a slurry material after washing with water but before separating the water.

17. A method of manufacturing spherical silica particles according to claim 1, wherein the amorphous silica is a wet one obtained by separating the water after the washing with water.

18. A method of manufacturing spherical silica particles according to claim 1, wherein the amorphous silica is dried after the washing with water.

19. A method of manufacturing spherical silica particles according to claim 1, wherein the amorphous silica is baked after washing with water.

20. A method of manufacturing spherical silica particles according to claim 19, wherein the baking is performed in a temperature range of 500°–1,300° C.

21. A method of manufacturing spherical silica particles according to claim 19, wherein the baking is performed in a temperature range 800°–1,290° C.

22. A method of manufacturing spherical silica particles according to claim 1, wherein the amorphous silica is a mixture in a desired proportion of a slurry one after washing with water but before separating the water;

a wet one after washing with water and separating the water;

a dry one after washing with water and drying; and a baked one after washing with water and baking.

23. A method of manufacturing spherical silica particles according to claim 1, wherein the average particle size of the fine particle silica is 5 $\mu$m or less.

24. A method of manufacturing spherical silica particles according to claim 1, wherein the average particle size of the fine particle silica is in a range of 0.3–1 $\mu$m.

25. A method of manufacturing spherical silica particles according to claim 1, wherein the concentration of silica in the fine particle silica suspension to be spray-dried is in a range of 5–80 wt. %.

26. A method of manufacturing spherical silica particles according to claim 1, wherein the concentration of silica in the fine particle silica suspension to be spray-dried is in a range of 10–60 wt. %.

27. A method of manufacturing spherical silica particles according to claim 1, wherein the fine particle silica suspension to be spray-dried is a mixture in a desired proportion of fine particle silica suspensions obtained by wet-grinding slurry amorphous silica after washing with water but before separating the water, wet amorphous silica after washing with water and separating the water, dry amorphous silica after washing with water and drying, and baked amorphous silica after washing with water and baking.

28. A method of manufacturing spherical silica particles according to claim 1, wherein a hot air temperature is in a range of 10°–450° C.

29. A method of manufacturing spherical silica particles according to claim 1, wherein a hot air temperature is in a range of 30°–250° C.

30. A method of manufacturing spherical silica particles according to claim 1, wherein the particle size of the spherical granulated silica is 0.2 mm or less.

31. A method of manufacturing spherical silica particles according to claim 1, wherein the particle size of the spherical granulated silica is 0.15 mm or less.

32. A method of manufacturing spherical silica particles according to claim 1, wherein the particle size of the spherical granulated silica is 0.1 mm or less.

33. A method of manufacturing spherical silica particles according to claim 1, wherein the spherical granulated silica consists of amorphous silicas different in thermal history.

34. A method of manufacturing spherical silica particles according to claim 1, wherein the spherical granulated silica is a mixture of unbaked amorphous silica and baked amorphous silica, and the mix ratio of them is in a range of 99:1–20:80 by weight.

35. A method of manufacturing spherical silica particles according to claim 1, wherein the spherical granulated silica is a mixture of unbaked amorphous silica and baked amorphous silica, and the mix ratio of them is in a range of 95:5–40:60 by weight.

36. A method of manufacturing spherical silica particles according to claim 1, wherein a sintering temperature is 1,000° C. or more.

37. A method of manufacturing spherical silica particles according to claim 1, wherein a sintering temperature is in a range of 1,100°–1,300° C.

* * * * *